(12) United States Patent
Itzkowitz

(10) Patent No.: US 11,344,148 B2
(45) Date of Patent: May 31, 2022

(54) BEVERAGE BREWING SYSTEM AND METHOD OF BREWING BEVERAGE

(71) Applicant: The Steelstone Group LLC, Brooklyn, NY (US)

(72) Inventor: Binyumen Itzkowitz, Brooklyn, NY (US)

(73) Assignee: The Steelstone Group, LLC, Brooklyn, NY (US)

(*) Notice: Subject to any disclaimer, the term of this patent is extended or adjusted under 35 U.S.C. 154(b) by 435 days.

(21) Appl. No.: 16/296,645

(22) Filed: Mar. 8, 2019

(65) Prior Publication Data
US 2019/0274471 A1 Sep. 12, 2019

Related U.S. Application Data

(60) Provisional application No. 62/640,737, filed on Mar. 9, 2018.

(51) Int. Cl.
A47J 31/32 (2006.01)
A47J 31/44 (2006.01)
A47J 31/24 (2006.01)
A47J 31/00 (2006.01)

(52) U.S. Cl.
CPC ........... *A47J 31/4403* (2013.01); *A47J 31/24* (2013.01); *A47J 31/32* (2013.01); *A47J 31/002* (2013.01)

(58) Field of Classification Search
CPC .......... A47J 31/32; A47J 31/24; A47J 31/043; A47J 31/047
USPC ............... 99/286, 287, 302 R, 472
See application file for complete search history.

(56) References Cited

U.S. PATENT DOCUMENTS

| 1,345,947 | A | * | 7/1920 | Muller | A47J 31/20 99/298 |
| 5,479,849 | A | | 1/1996 | King et al. | |
| 6,040,013 | A | * | 3/2000 | Karales | A23B 4/20 366/139 |
| 8,383,180 | B2 | | 2/2013 | Vastardis | |
| 8,586,117 | B2 | | 11/2013 | Vastardis et al. | |
| 9,295,358 | B2 | | 3/2016 | Vastardis et al. | |
| 9,402,405 | B2 | | 8/2016 | Vastardis et al. | |
| 9,763,461 | B2 | | 9/2017 | Vastardis et al. | |
| 9,907,430 | B2 | | 3/2018 | Vastardis et al. | |
| 10,117,444 | B2 | | 11/2018 | Vastardis et al. | |
| 2008/0041231 | A1 | * | 2/2008 | Beharry | A47J 31/54 99/279 |

(Continued)

FOREIGN PATENT DOCUMENTS

WO WO-2018159958 A1 * 9/2018 ............. A47J 31/36

OTHER PUBLICATIONS

Bkon, "Rain Reverse Atmospheric Infusion," Bkon, LLC., found online at Bkonbrew.com, published 2015. Retrieved from http://bkonbrew.com/singlecup/rain/.

(Continued)

*Primary Examiner* — Reginald Alexander
(74) *Attorney, Agent, or Firm* — Myers Wolin, LLC

(57) ABSTRACT

One embodiment of the present disclosure provides a beverage brewing system, including: a brewing chamber configured to hold a brewing fluid; a brew material filter within the brewing chamber; a vacuum source and a vent valve each coupled to the brewing chamber, the vacuum source and the vent valve being configured to be actuated consecutively; and a drain valve coupled to the brewing chamber.

19 Claims, 6 Drawing Sheets

(56) References Cited

U.S. PATENT DOCUMENTS

| | | | |
|---|---|---|---|
| 2010/0203209 A1* | 8/2010 | Fishbein | A47J 31/18 |
| | | | 426/433 |
| 2011/0097466 A1 | 4/2011 | Vastardis | |
| 2012/0100275 A1 | 4/2012 | Bishop et al. | |
| 2012/0219686 A1 | 8/2012 | Bombeck et al. | |
| 2013/0133524 A1 | 5/2013 | Vastardis et al. | |
| 2016/0198886 A1 | 7/2016 | Avins et al. | |
| 2019/0223652 A1* | 7/2019 | Ford | A47J 31/42 |

OTHER PUBLICATIONS

Dash Cold Grewer Bennett, Brian, "This coffee machine might actually make cold brew fast", found online at CNET.com, article published Sep. 6, 2017. Retrieved from https://www.cnet.com/reviews/dash-rapid-cold-brew-system-preview/.

Lee, Nicole, "This Machine makes cold brew coffee in less than 10 minutes [Pique Cold Brew]", Oath Tech Network Aol Tech., Article published Apr. 21, 2016, Retrieved from https://www.engadget.com/2016/04/21/pique-cold-brew/.

Indiegogo, "Prisma Cold Brew", First Build, Louisville, KY, Article found on Indiegogo.com, last visited Mar. 16, 2016. Retrieved from https://www.indiegogo.com/projects/prisma-cold-brew-coffee-technology#/.

McGarry, Caitlin, "First look: Prisma makes cold-brew coffee in 10 minutes flat," Found online at techhive.com / Prisma Cold Brew; Aug. 2, 2016; Retrieved from https://www.techhive.com/article/3102141/first-look-prisma-makes-cold-brew-coffee-in-10-minutes-flat.hlml.

International Search Report and written opinion issued by the International Searching Authority for corresponding International Patent Application No. PCT/US 2019/021305, dated Oct. 24, 2019.

\* cited by examiner

BEVERAGE BREWING SYSTEM AND METHOD OF BREWING BEVERAGE

CROSS-REFERENCE TO RELATED APPLICATIONS

This application claims the benefit of U.S. Provisional Application No. 62/640,737, filed on Mar. 9, 2018, the contents of which are incorporated herein by reference.

FIELD

The present disclosure relates to a beverage brewing system and a method of brewing beverage. For example, the present disclosure relates to coffee makers, and more particularly to a cold brew coffee system.

BACKGROUND

Various methods for brewing beverages exist. For example, cold brew coffee is a process in which ground coffee is steeped in cold water for several hours (or overnight). The cold brew process supposedly produces a smoother, less acidic brew than the conventional hot-water extraction. Further, a cold brew coffee maker can produce a strong coffee concentrate that can be stored in the refrigerator and diluted to taste with hot or cold water (or poured over ice) to make instant hot or iced coffee.

Many brewed beverages may be created from a wide variety of brewable ingredients, including coffee and tea. However, existing brew processes take a very long time in order to extract the flavor from brewing materials (e.g., the coffee ground). Therefore, there is a need for a system or a method than can extract the flavor from brewing materials with an increased extraction rate.

SUMMARY

One embodiment of the present disclosure provides a beverage brewing system, including: a brewing chamber configured to hold a brewing fluid; a brew material filter within the brewing chamber; a vacuum source and a vent valve each coupled to the brewing chamber, the vacuum source and the vent valve being configured to be actuated consecutively; and a drain valve coupled to the brewing chamber.

Another embodiment of the present disclosure provides a method of brewing a beverage, including: filling a brewing chamber with brewing fluid, such as water, the brewing chamber being coupled to a vacuum source, to a vent valve, and to a drain valve; putting brewing materials on a brew material filter within the brewing chamber; and consecutively actuating the vacuum source and the vent valve.

DETAILED DESCRIPTION OF THE PREFERRED EMBODIMENTS

Figure 1:
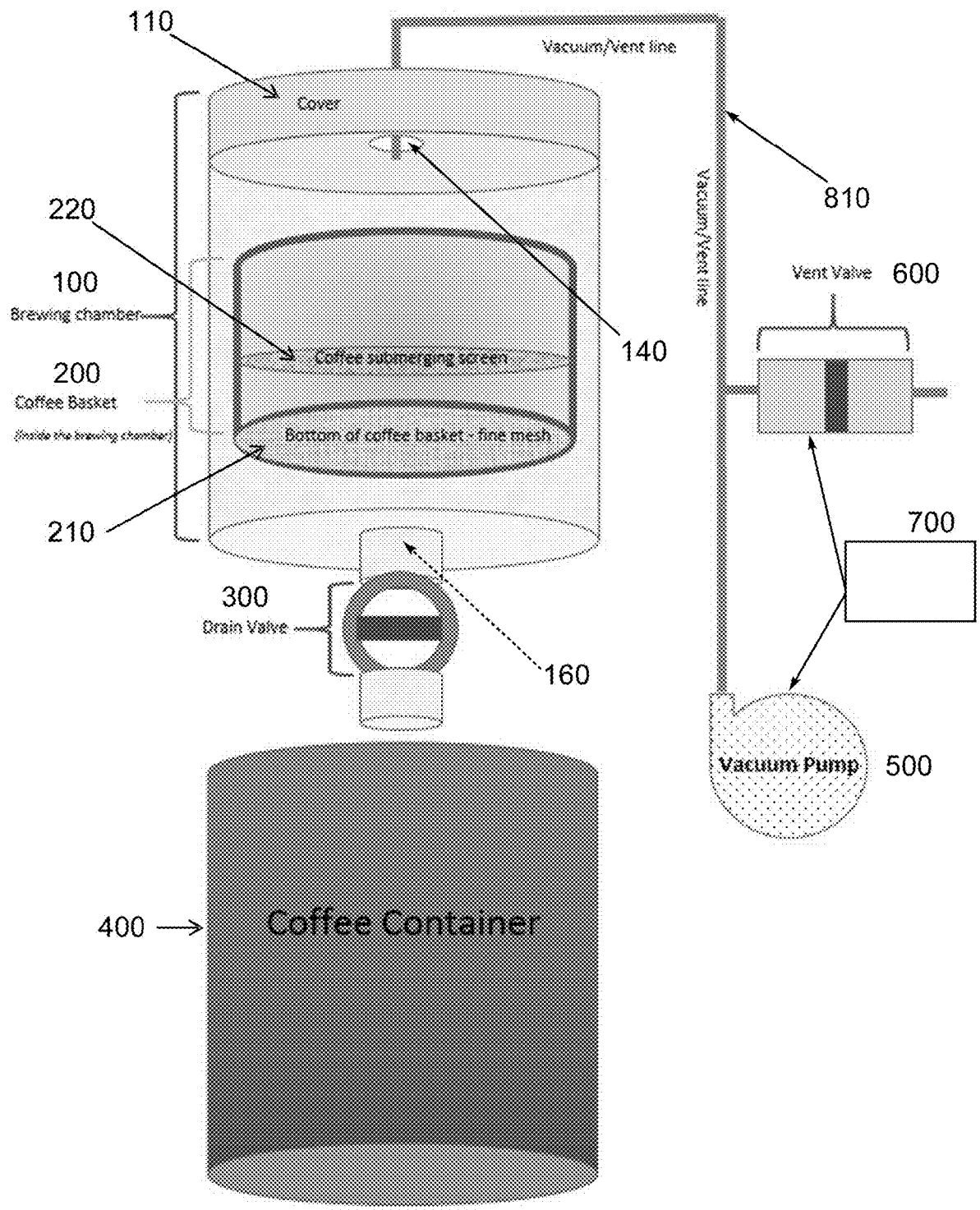
FIG. 1 shows an overview of a system according to an embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

An embodiment of the present disclosure may provide a beverage brewing system that uses vacuum and pressure difference to extract the flavor from brewing materials, such as coffee grounds. Although the present disclosure mainly discusses brewing coffee, a system and a method in the present disclosure may be applied not only to brewing coffee but also to brewing beverages other than coffee, such as tea and any other beverage that can be brewed. The term "brewing fluid" may include, but is not limited to, water, tea, coffee, juice, milk, soda, alcoholic liquids (i.e. liquids containing ethanol), and any other water or alcohol based consumable solution or combination thereof. The term "brewing material" may include, but is not limited to, coffee grounds, tea leaves, cocoa, fruit, grains, herbs, or any other materials used for brewing. Accordingly, while the system and process are described in terms of brewing coffee, they are equally applicable to brewing tea, infusing spirits, and the like.

In one example, the present disclosure may provide a cold brew coffee system that uses vacuum and pressure difference to extract the flavor from the coffee grounds. There may be no direct stirring of the water/coffee grounds.

The vacuum system described typically accomplishes at least one of three things:

1) The vacuum removes gasses from inside of the coffee grounds, thus allowing water deep into the pores of the grounds, increasing extraction rate.
2) The vacuum causes the remaining gasses inside of the grinds to expand (when vacuumed again) and force the water back out of the coffee grounds.
3) The vacuum system causes a difference in pressure across the coffee grounds. This forces water past the grounds, and slightly through the grounds themselves, resulting in faster extraction. The rushing water has another positive effect. There are 'sticky' substances (oils etc.) that stick to the surface of the coffee grounds even after those substances are forced out of the pores by expanding gasses within the grounds. The rushing water forces those substances to detach from the surface of the grounds more quickly and get mixed into the water.

The coffee brewing process according to an embodiment of the present disclosure may involve the application and release of a vacuum to the brewing chamber numerous times. During all this time the drain valve may be closed. After the vacuum cycles are done, the drain valve and the vent valve may open. This may result in the liquid coffee being deposited into a pitcher below the brewing chamber. Atmospheric air may be allowed to fill the brewing chamber through the open vent valve. After the initial drain, there may be still some liquid coffee remaining in the basket. Some more vacuum/drain cycles may be done in order to more completely purge the basket of all available liquid coffee.

FIG. 1 shows an overview of the main components of a cold brew coffee system according to an embodiment. As shown in FIG. 1, the system includes a brewing chamber 100 configured to hold a brewing fluid. The brewing chamber 100 typically includes a cover 110 that covers and seals the top of the brewing chamber. The cover may have a small port on top to allow air to enter (by way of a vent) or be extracted (by way of a vacuum) from the brewing chamber as required. Inside the chamber is a coffee ground basket 200 with a mesh bottom 210 to hold the coffee grounds. The basket 200 is one example of a brew material filter. The mesh bottom is porous to water. The basket includes an additional mesh screen 220 that holds the grounds down to keep them submerged under water.

A drain valve 300 may be coupled to the brewing chamber 100. In one example, the drain valve 300 may be coupled to an opening 160 (e.g. a second opening) of the chamber 100, and may be located at the bottom of the brewing chamber 100. In one example, the opening 160 coupled to the drain valve 300 may be disposed, for example without limitation, at the bottom of the chamber 100 or at the side of the chamber 100. In one embodiment, the drain valve 300 is closed during the brewing process, and the drain valve opens only at the end of the brewing process to let brewed coffee drip into a drinking or storage vessel, such as pitcher 400, located below. The pitcher or coffee container 400 is placed below the brewing chamber to accept the coffee from the brewing chamber at the end of the brewing process. In addition, a vacuum source 500 may be coupled to the chamber 100. In one example, the vacuum source 500 may be coupled to an opening 140 of the chamber 100. The opening 140 may be in a body of the brewing chamber 100 or in the lid 110 thereof. Typically during the brewing process, the lid 110 remains fixed to the body of the brewing chamber 100 resulting in a airtight or fluid tight seal, other than the openings 140, 160. The vacuum source 500 may create a vacuum in the brewing chamber by pumping air out. The vacuum source may include, but not limited to, a vacuum pump, an external vacuum source (in a commercial environment) or a hand plunger.

A vent valve 600 allows air to enter the brewing chamber 100 and restores normal atmospheric pressure after the vacuum source 500 is applied. The vent valve 600 may be coupled to the chamber 100. In the example in FIG. 1, the vent valve 600 is coupled to the opening 140 of the chamber 100. In the illustrated example, the vacuum source 500 and the vent valve 600 are interconnected to the brewing chamber 100, for example, in the form of a single pipeline 810. In another example (not shown), the vacuum source 500 and the vent valve 600 may be coupled to the chamber 100 at different locations, for example, by using different pipelines that are applied at different openings of the brewing chamber. In the present embodiment, the vacuum source 500 and the vent valve 600 may be configured to be actuated consecutively, by a processor 700, by a user of the system (i.e., manually) and/or by some other mechanism of the system. The processor 700 may be configured to control the vacuum source 500 and the vent valve 600 according to a predetermined sequence. The controlling by processor 700 may be conducted according to the sequence discussed with reference to FIGS. 2-5. While the vacuum source 500 is shown as a vacuum pump, it will be understood that other forms of vacuum sources are possible as well. For example, a manually operated system may be provided with a user manually actuating a vacuum source, such as a plunger. Alternatively, in commercial environments, the system may be provided with a vacuum source by way of a pneumatic tube, or the like, such that the actuation of the vacuum source is by way of opening or closing a valve, and not by actuating a pump.

Figure 2:
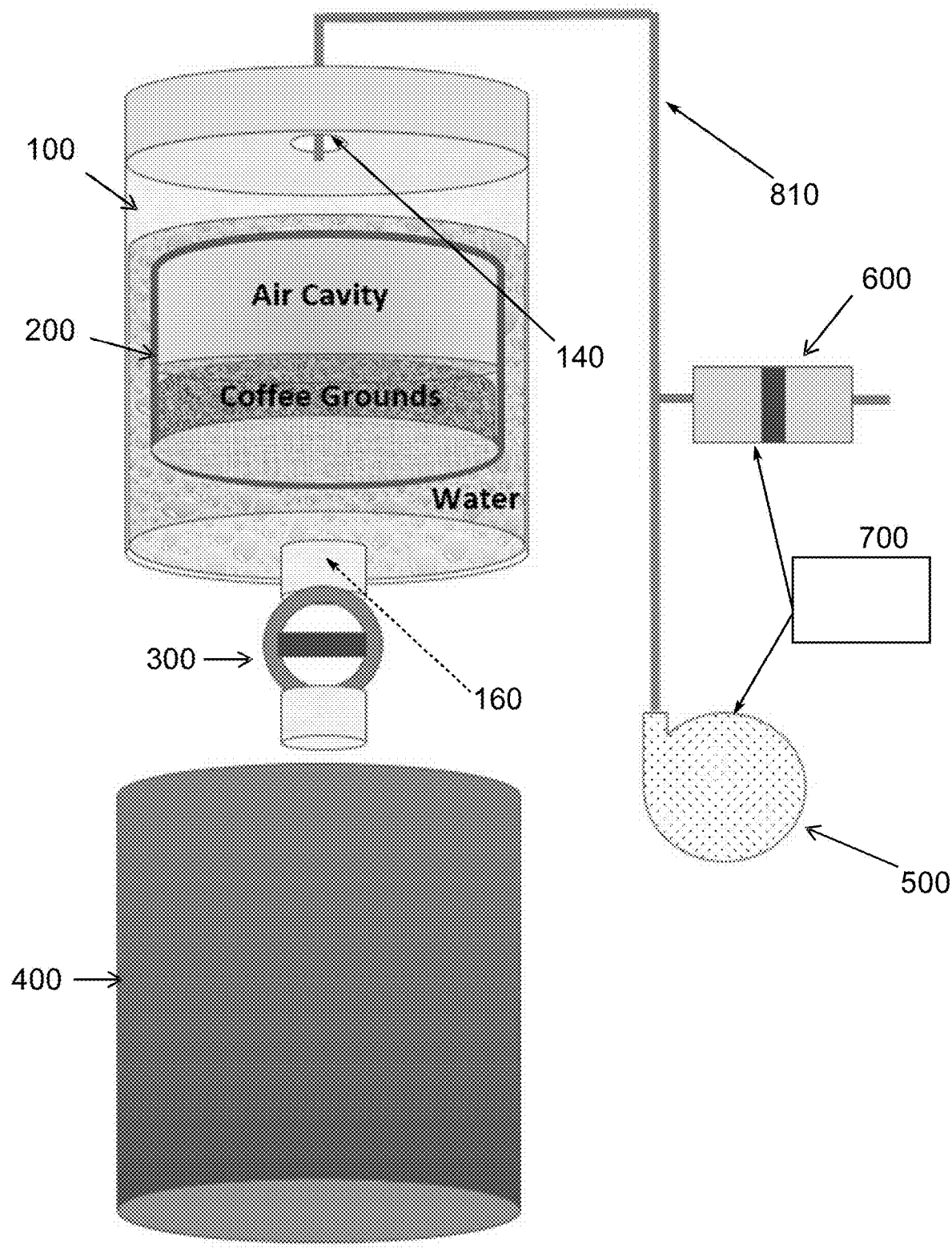
FIG. 2 shows an overview of a system according to an embodiment while such a system is in use.
Figure 6:
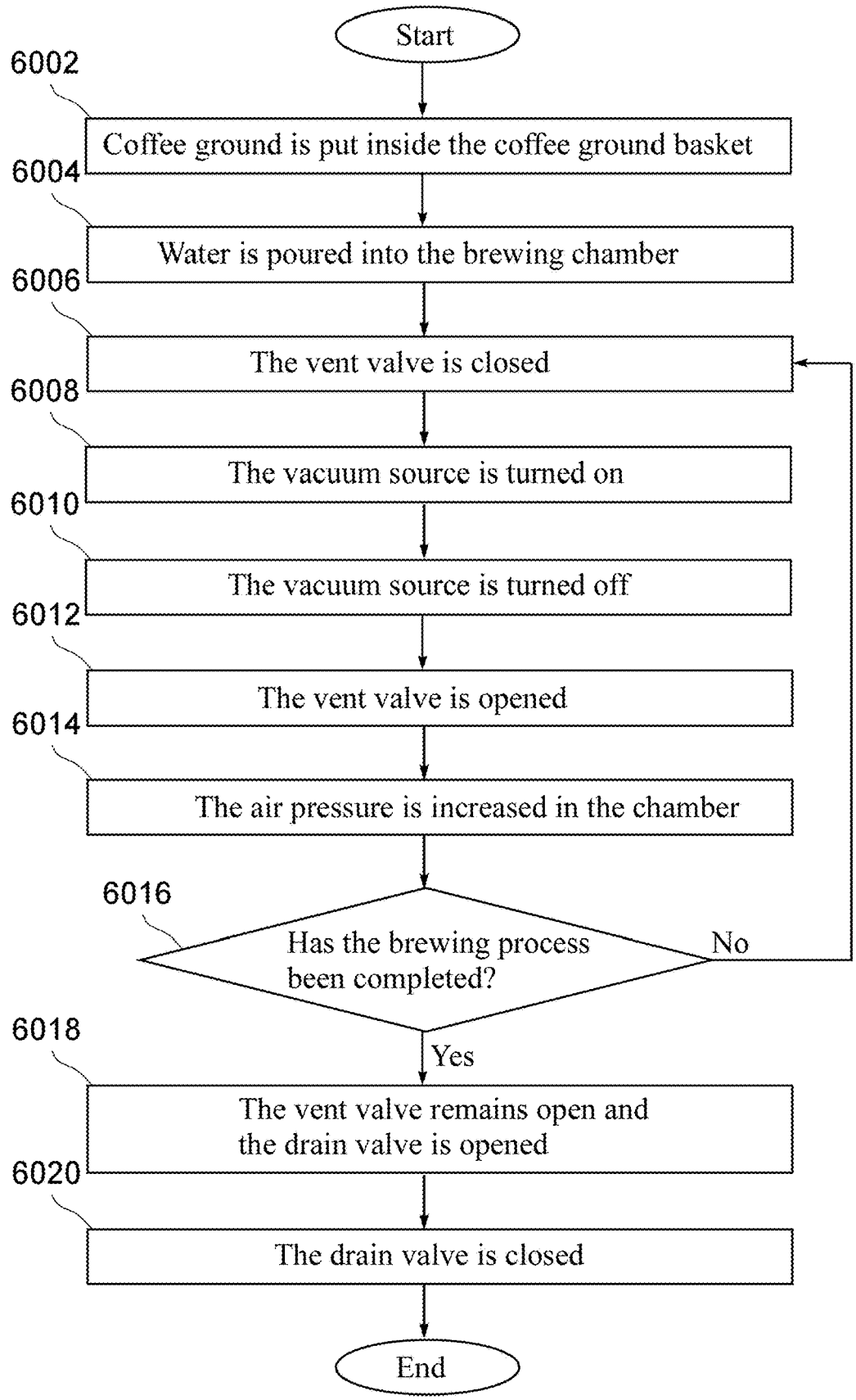
FIG. 6 is a flowchart illustrating use of a system according to an embodiment.

FIG. 6 provides a flowchart illustrating the use of the system for brewing coffee. The coffee brewing process involves the application and release of a vacuum to the brewing chamber numerous times. During all this time the drain valve is typically closed. After the vacuum application/release cycles are done, the drain valve and the vent valve open. This results in the liquid coffee dispensing into the pitcher below the brewing chamber. Atmospheric air is allowed to fill the brewing chamber through the open vent valve. Further, after the initial drain, there is still some liquid coffee remaining in the basket. Accordingly, in some embodiments, additional vacuum/drain cycles are done in order to purge the basket of all additional liquid coffee. A more detailed description of the brewing cycle is explained below:

FIG. 2 illustrates that at the start, coffee ground is put inside the coffee ground basket 200 (at 6002 in FIG. 6), and water is poured into the brewing chamber 100 (at 6004 in FIG. 6). After water is added, there is still an air cavity above the coffee ground inside the brewing chamber 100. Typically, the drain valve 300 is closed prior to the beginning of the brewing process.

Figure 3:
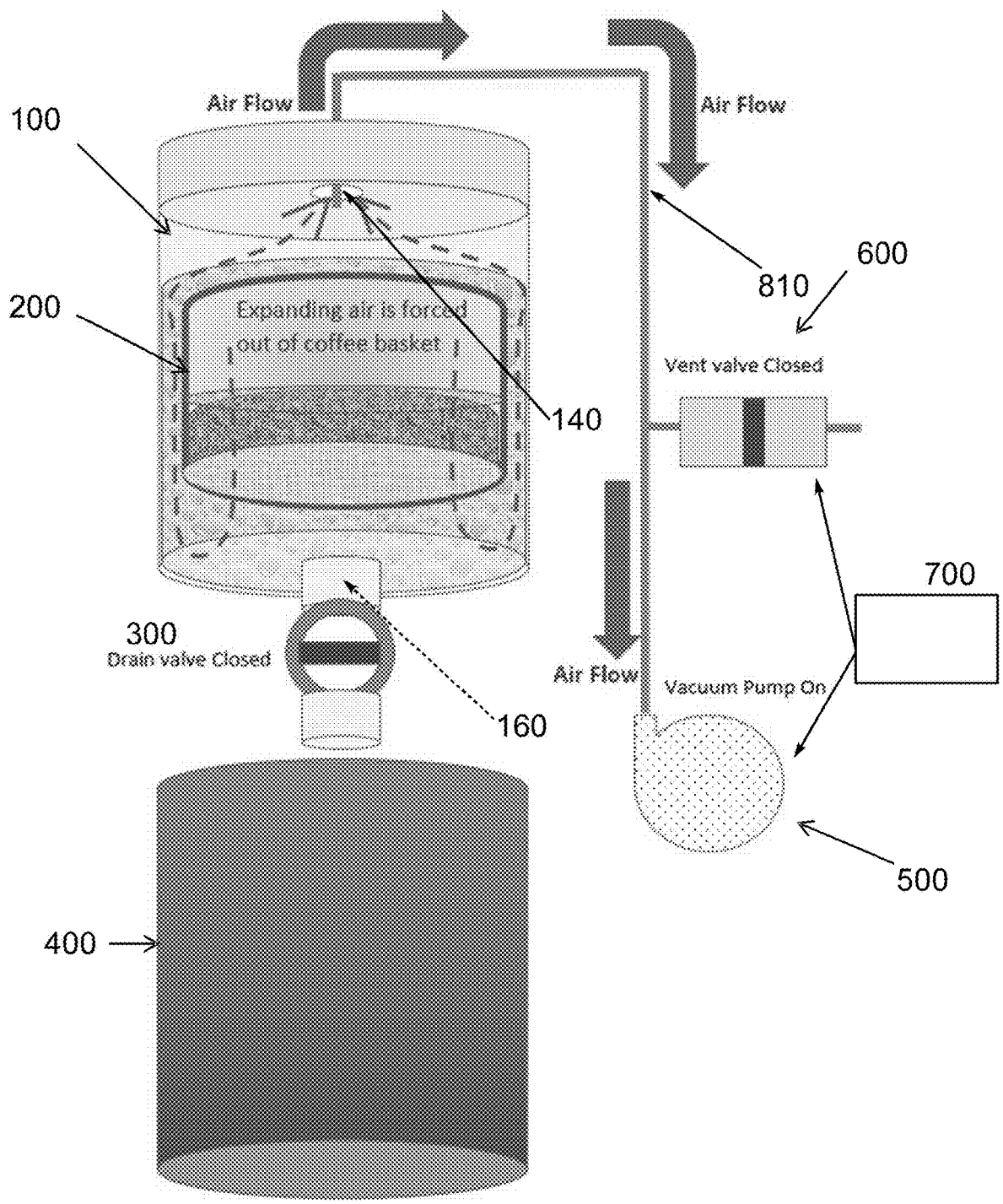
FIG. 3 shows an initial vacuum process in a system according to an embodiment.

Initial Vacuum:

FIG. 3 illustrates the initial vacuum process according an embodiment. The vent valve 600 is closed (at 6006 in FIG. 6) and the vacuum source 500 is turned on (at 6008 in FIG. 6). This results in air being extracted from the brewing chamber by way of the opening 140 and the pipeline 810, creating a partial vacuum in the chamber 100. As the coffee basket 200 is within the brewing chamber, this sucks air out of the bottom of the coffee basket creating a partial vacuum in the coffee basket.

Figure 4:
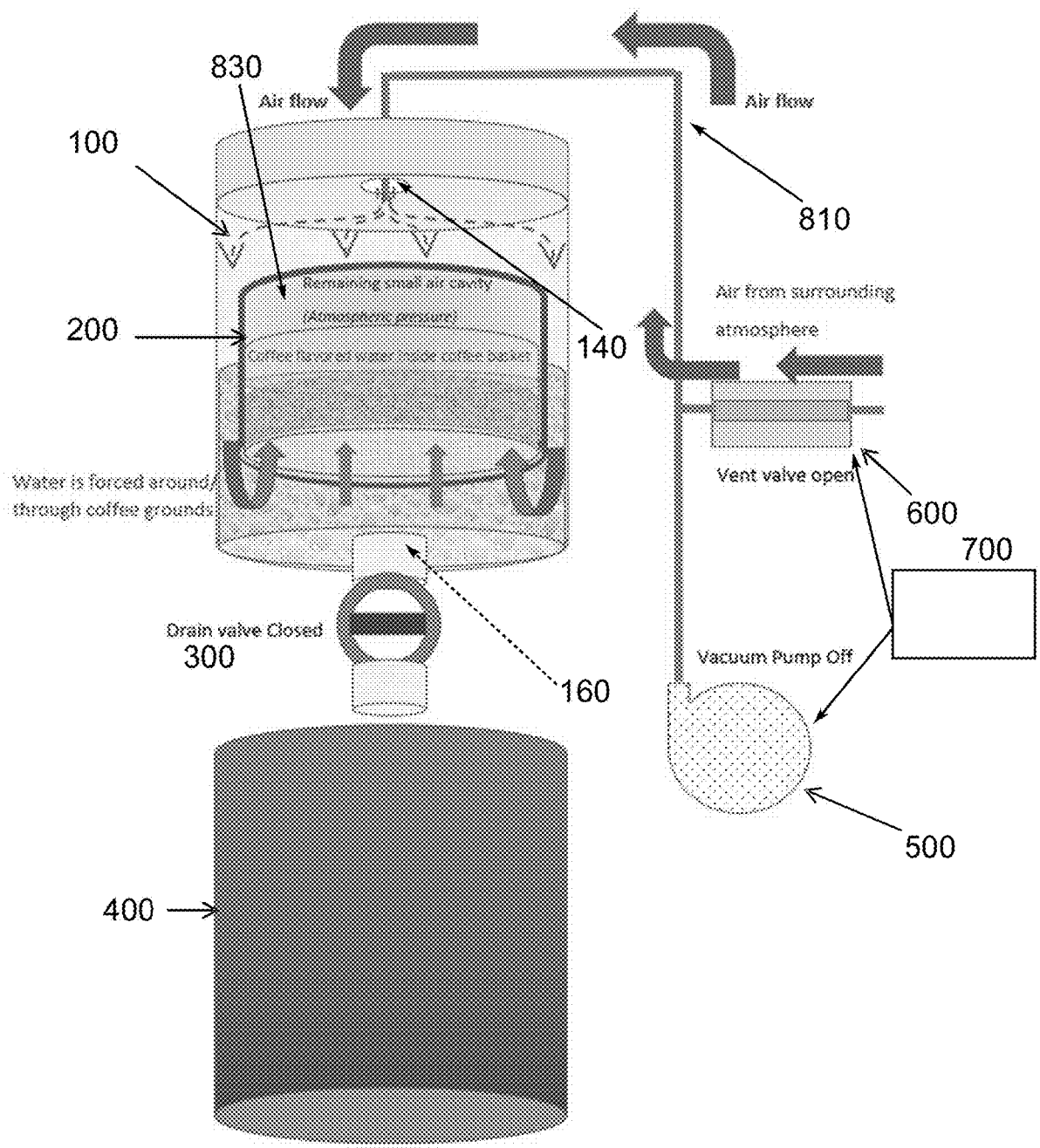
FIG. 4 shows an initial vent process in a system according to an embodiment.

Initial Vent:

FIG. 4 illustrates the initial vent process according to the embodiment shown. The vacuum source 500 is turned off (at 6010 in FIG. 6) and the vent valve 600 is opened (at 6012 in FIG. 6). This allows atmospheric air to enter the brewing chamber 100, thereby increasing the air pressure in the chamber 100 (at 6014 in FIG. 6), and causing the water in the brewing chamber 100 to move through the porous bottom of the basket. This air then pushes down on the water and forces the water through/around the coffee grounds and into the coffee basket 200. Some water is forced deep into the pores of the coffee grinds. Thus, coffee flavored water is formed inside the basket. A small cavity of air 830, at atmospheric air pressure, remains at the top of the coffee basket.

Subsequent Vacuum/Vent Cycles:

The process described, including the application of a vacuum source 500 followed by the venting by way of the vent valve 600, is repeated for the length of the brewing cycle. Accordingly, in embodiments utilizing a processor 700 to control the brewing process, after the brewing chamber 200 is vented, the processor determines whether the brewing process has been completed (at 6016 in FIG. 6). If not, the method returns to close the vent valve 600 (at 6006 in FIG. 6) and once again to apply the vacuum source (at 6008 in FIG. 6).

Accordingly, at the next vacuum cycle, just like the initial vacuum, the drain valve 300 and vent valve 600 are closed and the vacuum source 500 is applied. The water is then pulled out of the pores of the coffee grounds. This is due to the remaining gases in the grounds now expanding under lowered pressure. At the same time, the water in the coffee basket 200 is forced through/around the grounds and out into the brewing chamber 100. The water carries with it the rich extracted flavor from the coffee grounds. More vacuum/vent cycles can be done to extract more flavor from the coffee grounds. The number of vacuum/vent cycles may be based on a user preference and/or type of coffee grounds or other brewing material used. For example, the processor 700 may be utilized to implement a "recipe" made up of a predetermined number of vacuum cycles, applying a predetermined ideal pressure level, or the like, where the recipe may be tailored to user's preferences or the specific brewing material used. In this way, the processor 700 may be configured to control the vacuum source 500 and the vent valve 600 according to a predetermined sequence.

Figure 5:
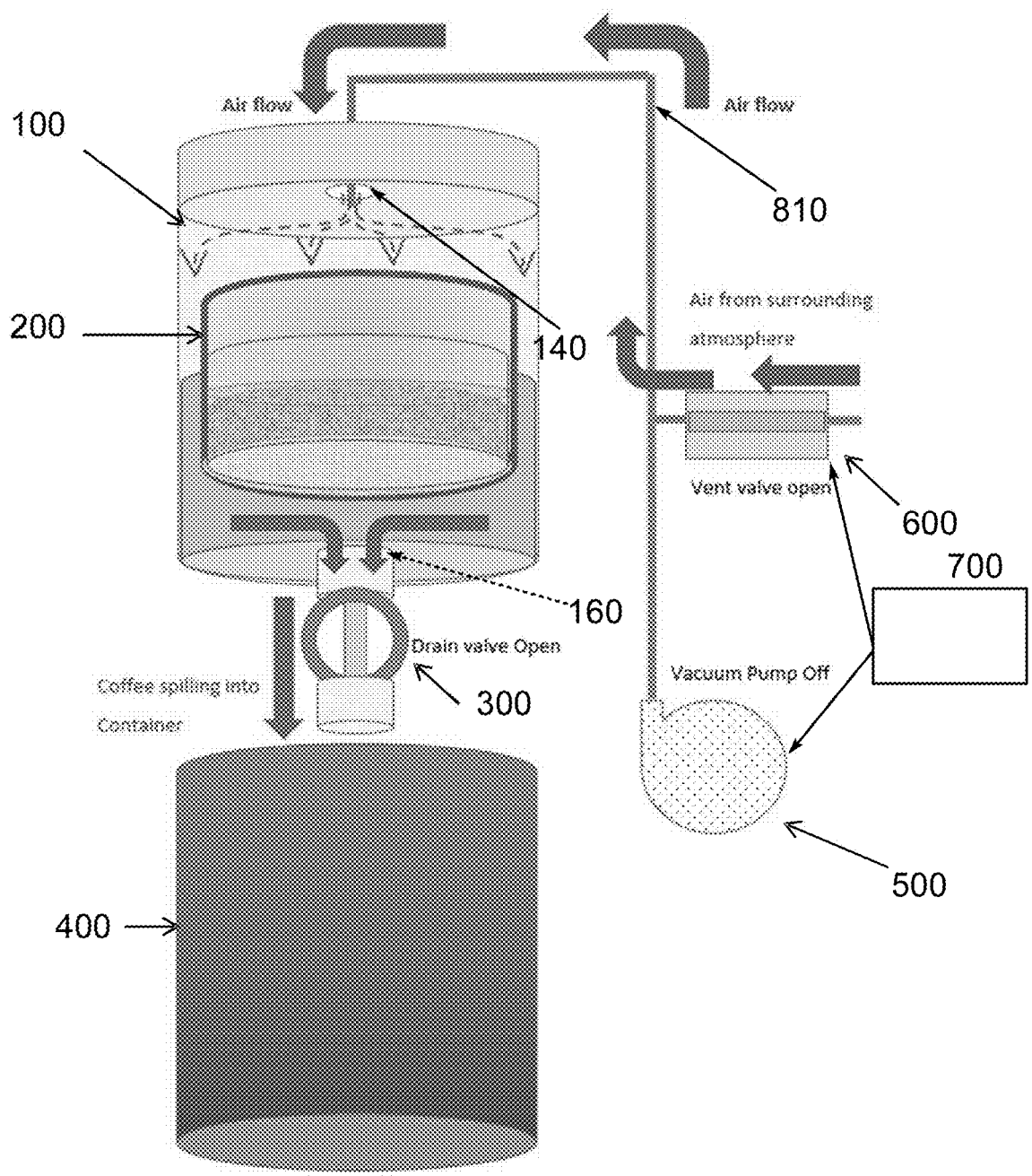
FIG. 5 shows a drain process in a system according to an embodiment.

After completion of the one or more vacuum/vent cycles, the coffee is ready to be drained out. FIG. 5 illustrates the draining of the coffee from the chamber according an embodiment. After the brewing chamber 100 is vented to atmospheric pressure, the vent valve 600 remains open and the drain valve 300 is opened (at 6018 in FIG. 6). The liquid coffee thus falls into the container 400 below the drain valve 300. Air from the surrounding atmosphere can flow into the brewing chamber 100 (via the vent valve) to replace the volume of the liquid coffee that is running out of the bottom of the chamber 100.

Purge Cycles:

After the initial drain, there is typically still some liquid coffee remaining in the basket 200. Some more vacuum/drain cycles are done in order to more completely purge the basket of all available liquid coffee. In such an embodiment, the drain valve 300 is closed (at 6020 in FIG. 6) and the additional cycles are applied before reopening the drain valve.

An embodiment of the present disclosure satisfies a long-felt need for a speedier cold brew processing system and method that makes smooth and rich flavored coffee. Note that the system and process disclosed is directed to brewing coffee as a non-limiting example, it is contemplated that the system and process can be applied to brewing other beverages, such as tea or other flavored drinks.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A beverage brewing system, comprising:
   a brewing chamber configured to hold a brewing fluid;
   a basket for retaining brewing material within the brewing chamber, the basket including a porous bottom and a closed top; and
   a vacuum source and a vent valve each coupled to the brewing chamber, the vacuum source and the vent valve being configured to change pressure in the brewing chamber upon their respective actuation,
   wherein, upon actuation of the vacuum source or the vent valve, a resulting corresponding decrease or increase in pressure in the brewing chamber causes brewing fluid in the brewing chamber to move out of or into the basket respectively through the porous bottom of the basket.

2. The system of claim 1, wherein the chamber has a first opening and a second opening, the first opening being coupled to the vacuum source and to the vent valve, and the second opening being coupled to a drain valve.

3. The system of claim 1, further comprising a processor configured to control the vacuum source and the vent valve according to a predetermined sequence.

4. The system of claim 3, wherein the processor is configured to control the vacuum source and the vent valve according to the following sequence:
   (a) closing the vent valve and starting the vacuum source, such that air is pumped out from the brewing chamber from the first opening, creating a partial vacuum in the basket;
   (b) stopping the vacuum source and opening the vent valve, such that air enters into the brewing chamber, causing brewing fluid in the brewing chamber to move through the porous bottom into the basket from the outside of the basket;
   (c) closing the vent valve and starting the vacuum source, such that brewing fluid in the basket is forced to move through the porous bottom out of the basket;
   (d) stopping the vacuum source and opening the vent valve, such that air enters into the brewing chamber, causing the brewing fluid in the brewing chamber to move through the porous bottom into the basket from the outside of the basket; and
   (e) repeating (c) and (d) for a plurality of numbers of cycles.

5. The system of claim 4, wherein the processor is further configured to control the drain valve, and wherein the processor is configured to keep the drain valve closed during (a)-(e); and upon the completion of (e), the processor is configured to open the drain valve to drain the brewing chamber.

6. The system of claim 5, wherein upon draining the brewing chamber, the processor is further configured to close the drain valve and to repeat (c) and (d) for a plurality of cycles, and to open the drain valve to further drain the brewing chamber.

7. The system of claim 2, wherein the first opening is coupled to the vacuum source and the vent valve via one or more pipe.

8. The system of claim 1, further comprising a drain valve coupled to the brewing chamber,
wherein the vacuum source and the vent valve are configured to be actuated consecutively.

9. The system of claim 8, further comprising a container coupled to the drain valve.

10. The system of claim 1, wherein the basket includes a screen configured to keep brewing materials retained therein submerged in the brewing fluid.

11. The system of claim 2, wherein the first opening is disposed at a top of the brewing chamber, and the second opening is disposed at a bottom of the brewing chamber.

12. A method of brewing beverage, comprising:
partially filling a brewing chamber with brewing fluid, the brewing chamber being coupled to a vacuum source, and to a vent valve, wherein the vacuum source and the vent valve are configured to change pressure in the brewing chamber upon their respective actuation;
putting brewing materials in a basket within the brewing chamber, the basket including a porous bottom and a closed top; and
actuating each of the vacuum source and the vent valve consecutively to change pressure in the brewing chamber, wherein, upon respective actuation of the vacuum source or the vent valve, a corresponding resulting decrease or increase pressure in the brewing chamber causes brewing fluid in the brewing chamber to move out of or into the basket respectively through the porous bottom of the basket.

13. The method of claim 12, wherein the brewing chamber has a first opening and a second opening, the first opening being coupled to the vacuum source and to the vent valve, and the second opening being coupled to a drain valve.

14. The method of claim 13, further comprising controlling the vacuum source and the vent valve according to a predetermined sequence.

15. The method of claim 14, wherein the controlling comprises:
(a) closing the vent valve and starting the vacuum source, such that air is pumped out from the brewing chamber from the first opening, creating a partial vacuum in the basket;
(b) stopping the vacuum source and opening the vent valve, such that air enters into the brewing chamber, causing brewing fluid in the brewing chamber to move through the porous bottom into the basket from the outside of the basket;
(c) closing the vent valve and starting the vacuum source, such that brewing fluid in the basket is forced out into the brewing chamber through the porous bottom out of the basket;
(d) stopping the vacuum source and opening the vent valve, such that air enters into the brewing chamber, causing the brewing fluid in the brewing chamber to move through the porous bottom into the basket from the outside of the basket; and
(e) repeating (c) and (d) for a plurality of numbers of cycles.

16. The method of claim 15, further comprising:
keeping the drain valve closed during (a)-(e); and
upon the completion of (e), opening the drain valve to drain the brewing chamber.

17. The method of claim 16, further comprising:
upon draining the brewing chamber, closing the drain valve and to repeat (c) and (d) for a plurality of numbers of cycles; and
opening the drain valve to further drain the brewing chamber.

18. The method of claim 13, wherein the first opening is disposed at a top of the brewing chamber, and the second opening is disposed at a bottom of the brewing chamber.

19. The method of claim 11, wherein the basket includes a porous screen; and
wherein actuating each the vacuum source and the vent valve includes actuating the vacuum source and the vent valve, such that:
when the pressure in the brewing chamber is reduced, the brewing fluid in the brewing chamber moves through the porous screen from the basket out of the basket; and
when the pressure in the brewing chamber is increased, the brewing fluid in the brewing chamber moves through the porous screen into the basket from the outside of the basket.

\* \* \* \* \*